Jan. 16, 1968    C. SCHULTZ    3,363,938
COLLAPSIBLE TRUCK COVER
Filed Aug. 6, 1965                                3 Sheets-Sheet 1
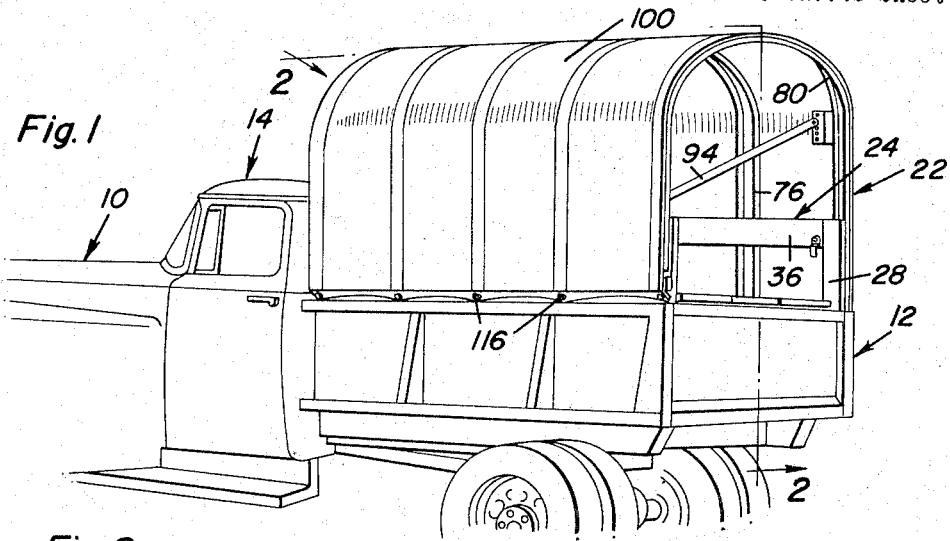
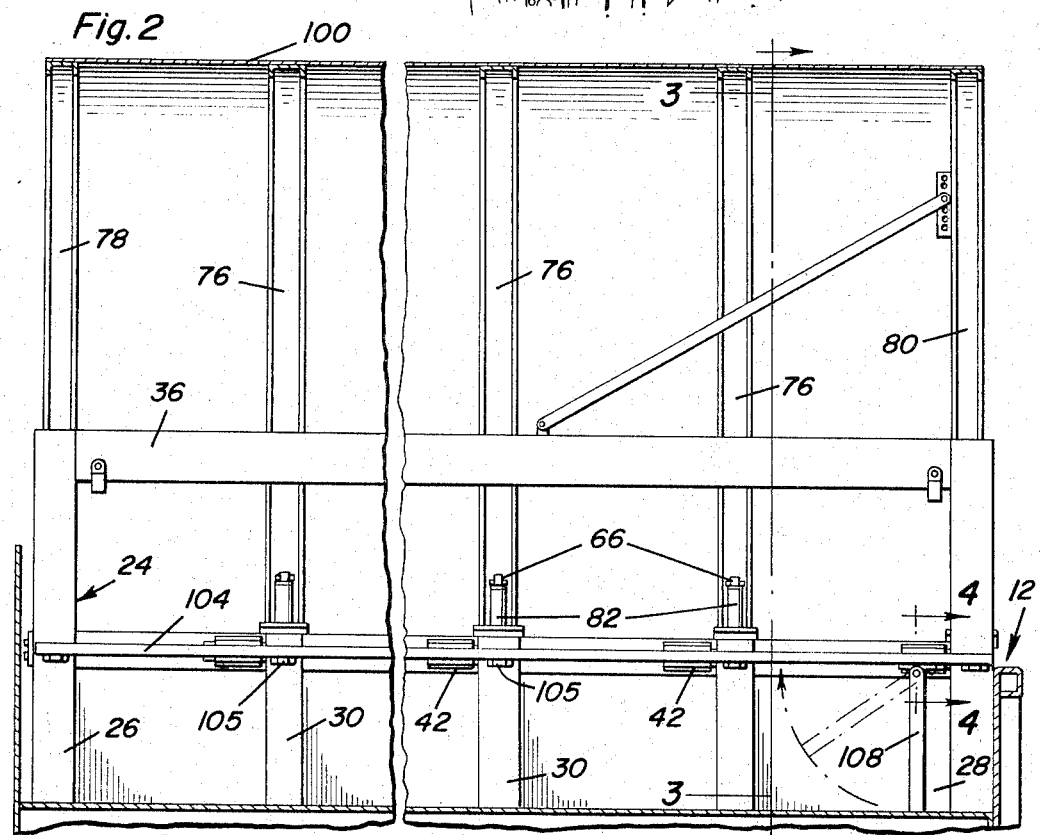
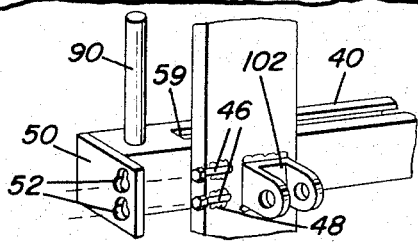
Carl Schultz
INVENTOR.
BY Clarence A. O'Brien
and Harvey B. Jacobson
Attorneys

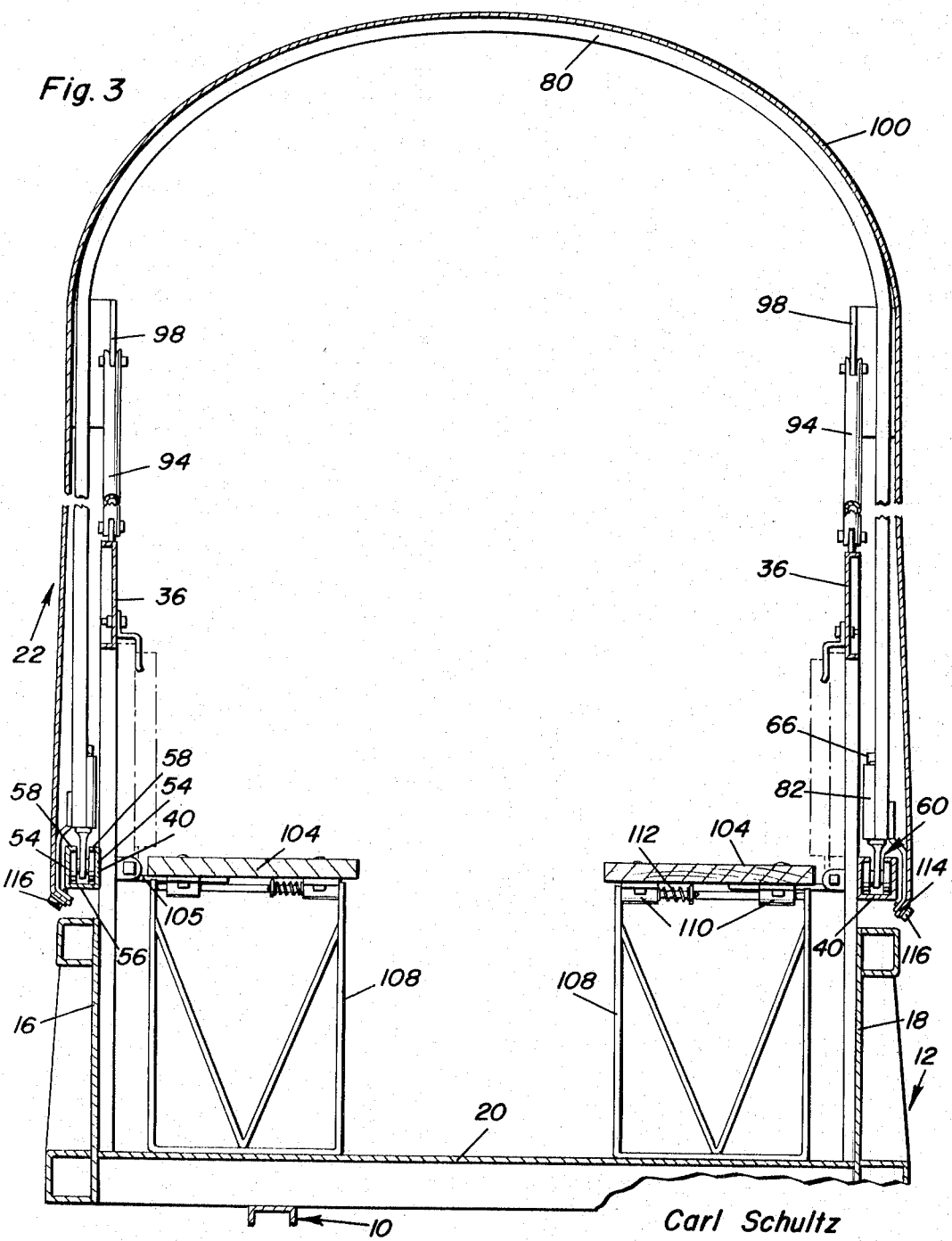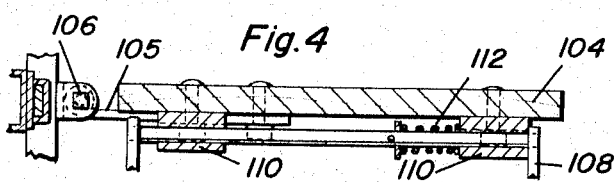

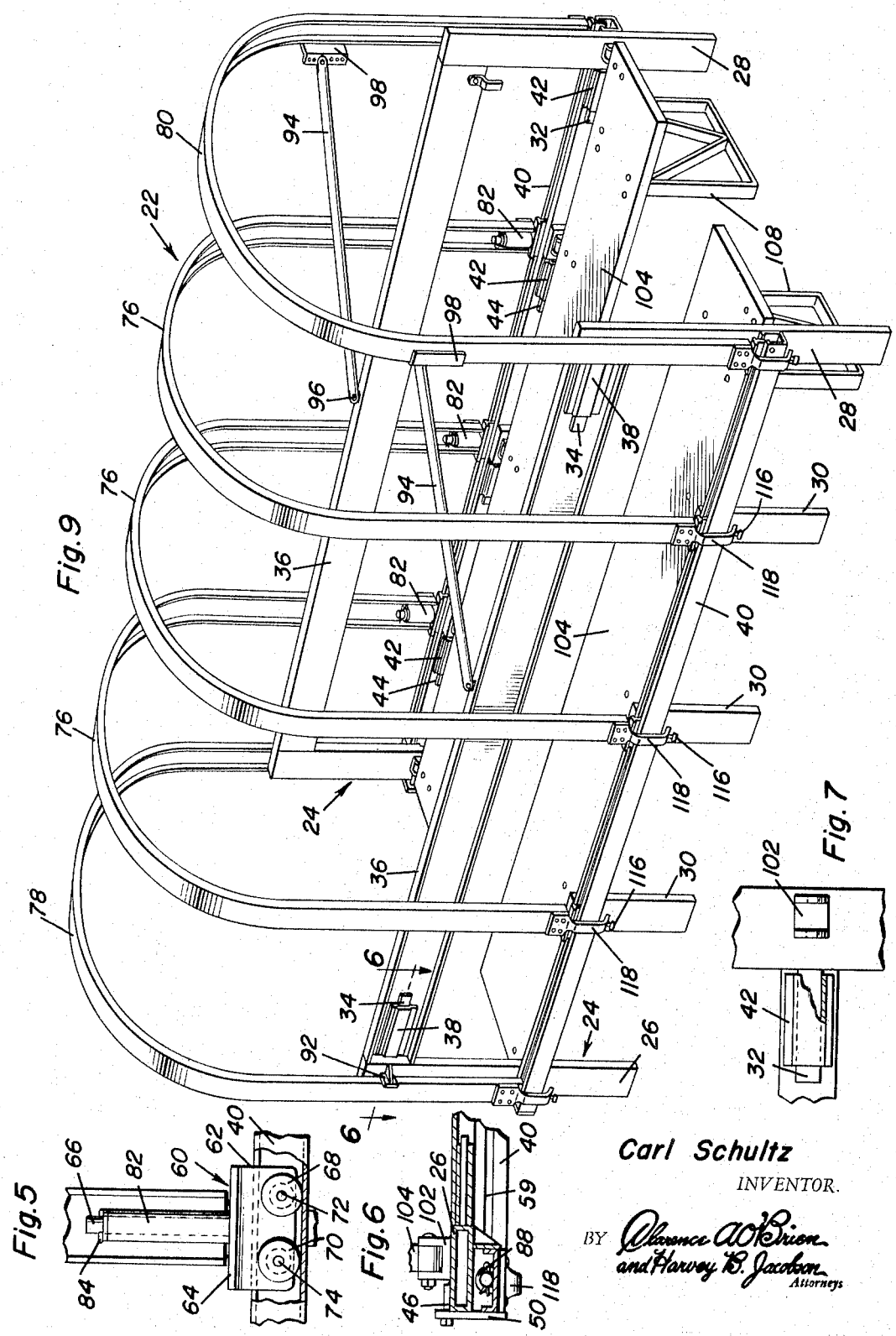

United States Patent Office 3,363,938
Patented Jan. 16, 1968

3,363,938
COLLAPSIBLE TRUCK COVER
Carl Schultz, Fargo, N. Dak., assignor to Schultz Manufacturing Company, Inc., Wahpeton, N. Dak.
Filed Aug. 6, 1965, Ser. No. 477,761
7 Claims. (Cl. 296—100)

This invention relates to a novel and useful collapsible truck cover and more specifically to a collapsible truck cover adapted to be mounted on the load bed of a truck and including mounting means therefor adapting the cover portion of the entire cover assembly to be readily removed from the associated truck load bed.

The truck cover assembly of the instant invention includes mounting means adapted to be secured to and extend along opposite sides of a truck load bed and a plurality of downwardly opening cover element supporting bows are supported from and extend between the aforementioned mounting means and they are adapted to have a flexible cover element disposed thereover. The mounting means carried by opposite sides of the cover assembly include generally horizontal elongated opposite side track members which are readily removably supported from the mounting means and the lower ends of the bows include means guidingly engaged with the track members for movement therealong. In this manner, the flexible cover element disposed over the bows is retractable and extendible upon movement of the bows relative to the mounting means between retracted and extended positions.

In addition to providing a means for movably supporting the bows of the truck cover assembly, the mounting means of the cover assembly secured to opposite sides of an associated truck also pivotally support a pair of elongated opposite side seat members which extend longitudinally of the associated truck and are substantially horizontally disposed when in the operative positions and disposed inwardly of the sides of the associated truck body or load bed. The remote edge portions of the seat members are pivotally supported from the aforementioned mounting means of the cover assembly for swinging movement about horizontal axes extending longitudinally of the associated truck load bed and are pivotable, from the horizontally disposed operative positions, to retracted positions with their free edge portions inclined upwardly and with the seat members closely overlying the lower portions of the associated sides of the truck load bed. In addition, the seat members include elongated leg means mounted thereon for movement between retracted positions closely underlying and generally parallelling the corresponding seat members and extended positions depending downwardly from the seat members when the latter are in their operative positions. Accordingly, it may be seen that the associated truck body or load bed may be utilized to transport workmen when the seat members are in the lowered operative positions and to carry any suitable bulk load when the seat members are in their raised retracted positions.

It is of course to be understood that the cover portion of the cover assembly may be readily moved between extended and retracted positions independent of movement of the seat members between their operative and inoperative positions and therefore that the cover assembly may be utilized to provide protection from the elements for personnel being transported in the truck and also for bulk loads being carried in the associated truck.

The main object of this invention is to provide a collapsible truck cover assembly for the load bed or body of a truck and which may be moved between an extended position overlying and covering the load bed and a retracted position providing substantially unlimited access to the associated load bed or body.

Another object of this invention is to provide a collapsible truck cover assembly in accordance with the immediately preceding object and including retractable means for defining seats within the associated load body and adapted to have numerous workmen seated thereon whereby the truck with which the collapsible cover assembly is operatively associated may be used for carrying a relatively large number of workmen as well as for transporting the bulk cargo for which it was designed to carry.

A still further object of this invention is to provide a retractable truck body, in accordance with the preceding objects and including novel means for guidingly supporting the lower ends of the bows on the elongated track members therefor whereby the upper ends of the retractable bows will receive some support through the bows to resist movement of the upper end portions of the bows toward their retracted positions when the truck cover assembly is in its extended operative position.

Yet another object of this invention is to provide a collapsible truck cover assembly including mounting means therefor adapted to operably mount the truck cover assembly from substantially all types of truck body load beds.

A final object of this invention to be specifically enumerated herein is to provide a collapsible truck cover assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a conventional form of dump truck shown with the collapsible truck cover assembly of the instant invention operatively associated with the dump load bed of the truck;

FIGURE 2 is an enlarged fragmentary vertical sectional view taken substantially upon the plane indicated by the section line 2—2 of FIGURE 1;

FIGURE 3 is an enlarged fragmentary transverse vertical sectional view taken substantially upon the plane indicated by the section line 3—3 of FIGURE 2;

FIGURE 4 is an enlarged fragmentary transverse vertical sectional view taken substantially upon the plane indicated by the section line 4—4 of FIGURE 2;

FIGURE 5 is a fragmentary enlarged side elevational view of the inside of one of the legs of the bows of the cover assembly showing the manner in which the leg is supported from the associated track member of the mounting means for the cover assembly;

FIGURE 6 is an enlarged fragmentary horizontal sectional view taken substantially upon the plane indicated by the section line 6—6 of FIGURE 9;

FIGURE 7 is a fragmentary side elevational view of the portion of the mounting means for the truck cover assembly illustrated in the extreme right hand portion of FIGURE 9 and illustrating the manner in which the rear end of the associated track member is removably supported from the adjacent portion of the mounting means;

FIGURE 8 is a fragmentary enlarged exploded perspective view of the remote end of the elongated track member illustrated in part in FIGURE 7 of the drawings and illustrating the manner in which the front end of the track member is removably supported from the adjacent portion of the mounting means for the truck cover assembly; and FIGURE 9 is an enlarged perspective view of the collapsible truck cover assembly illustrated with the flexible cover element thereof removed.

With attention now directed more specifically to the drawings, the numeral 10 generally designates a conventional form of truck body including a dump body portion generally referred to by the reference numeral 12 and a cab body portion generally referred to by the reference numeral 14. The dump body portion 12 includes a pair of upstanding side walls 16 and 18 interconnected by means of a bottom wall 20 and the collapsible truck cover assembly of the instant invention is supported solely from the dump body portion 12 and generally referred to by the reference numeral 22.

With attention now invited more specifically to FIGURES 3 and 9 of the drawings, it may be seen that the truck cover assembly 22 includes a pair of opposite side mounting means or frame assemblies generally referred to by the reference numerals 24. The mounting assemblies 24 each includes a pair of long upstanding opposite end members 26 and 28 and a plurality of longitudinally spaced short intermediate upstanding members 30. Each of the members 28 and 30 includes a forwardly projecting and generally horizontally disposed anchor arm 32 and the upper ends of each pair of end members 26 and 28 include laterally directed generally horizontal anchor arms 34, the anchor arms 34 of each pair of end members 26 and 28 projecting toward each other.

Upper generally horizontally disposed brace members 36 each including a pair of opposite and sleeve-defining brackets 38 are provided and the brace members 36 are secured between the corresponding end members 26 and 28 with the anchor arms 34 snugly received in the corresponding sleeve-defining brackets 38.

A pair of elongated and horizontally disposed opposite side track members 40 are provided and have secured thereto, at points spaced longitudinally therealong, sets of a plurality of sleeve-defining brackets 42 which are similar to the sleeve-defining brackets 38. The upper ends of the intermediate members 30 are provided with horizontally aligned anchor arms 44 corresponding to the anchor arms 32 and each track member 40 is secured to the corresponding end and intermediate members 28 and 30 with the anchor arms 32 and 44 thereof snugly received through the corresponding sleeve-defining brackets 42.

The end members 26 each have a pair of headed bolt members 46 secured thereto in any convenient manner such as by welding 48 and it may be seen from FIGURE 8 of the drawings that the forward ends of the track members 40 include end plates 50 which project inwardly and are provided with keyhole slots 52 for removable engagement with the headed bolts 46.

From FIGURE 3 of the drawings it may be seen that each track member 40 is generally channel-shaped in cross section including a pair of opposite side walls 54 interconnected by means of a bottom wall 56 and terminating at their upper ends in inwardly directed partial top walls 58. A longitudinally extending slot 59 is defined between the confronting longitudinal edge portions of the partial top walls 58 of each track member 40 and a plurality of follower assemblies generally referred to by the reference numerals 60 are provided for each track member 40 and disposed in guiding engagement with the latter for movement longitudinally therealong. Each of the follower assemblies 60 includes an upstanding plate-like body portion 62 terminating at its upper end in a horizontal plate-like member 64. An upstanding rod-like shank 66 is secured to the upper surface of each horizontal member 64 and a plurality of follower elements in the form of rollers 68 and 70 are journaled from the lower end portions of each vertical member 62 and disposed in rolling contacting engagement with the confronting upper surface of the corresponding web or bottom 56 and the undersurface portions of the corresponding partial top walls 58. The rollers 68 are journaled on an axle 72 secured through the vertical member 62 and the rollers 70 are journaled on a similar axle 74. The axles 72 and 74 are disposed at different elevations in order that the rollers 68 will engage the upper surface portions of the web 56 and the rollers 70 will engage the undersurface portions of the partial top walls 58 when the rod-like shanks 66 are substantially vertically disposed.

A plurality of intermediate bows 76 and front and rear end bows 78 and 80 are supported from the track members 40. Each of the bows 76 and 80 includes a pair of sleeve members 82 which slidably and snugly receive the corresponding rod-like shank 66 with the latter secured therethrough by means of a suitable removable fastener 84. The lower ends of the bow 78 are provided with similar sleeve-defining members 88 which are telescoped downwardly over upstanding anchor rods 90 secured to the forward ends of the track members 40.

The upper ends of the end members 26 include abutments 92 which abut the rear edge portions of the opposite sides of the bow 78 and brace the latter against movement toward the rear end of the dump body portion 12. In addition, when the bows 76 and 80 are fully extended as illustrated in FIGURE 9 of the drawings, it may be seen that a pair of inclined brace members 94 are pivotally secured at their forward and lower ends to the brace members 36 as at 96 and adjustably secured to a pair of anchor brackets 98 carried by the rear bow 80. The brace members 94 are provided to prevent the upper portion of the rear bow 80 from moving forwardly when the collapsible truck cover assembly 22 is in its extended position. By bracing the front bow 78 as at 92 and the rear bow 80 as at 94, proper tensioning of the flexible cover element 100 may be maintained.

The end members 26 and 28 and the intermediate members 30 have a plurality of mounting brackets 102 secured thereto and a pair of elongated longitudinally extending seat-forming members 104 are pivotally secured to each set of mounting brackets 102 by means of a plurality of hinge arms 105 and hinge pins 106 carried by the corresponding seat members 104. The seat members 104 are mounted for swinging movement between the horizontally disposed operative positions illustrated in FIGURE 3 of the drawings and the raised inoperative positions illustrated in phantom lines in FIGURE 3 of the drawings. A plurality of elongated leg assemblies 108 are pivotally secured to each seat member 104 at points spaced longitudinally therealong by means of suitable journals 110 secured to the seat-forming members 104 and are swingable between the depending positions illustrated in FIGURE 3 of the drawings and raised inoperative positions closely underlying the undersurfaces of the seat members 104. Each of the elongated leg assemblies 108 includes spring means 112 operatively connected between the leg assemblies 108 and the corresponding seat member 104, the spring means 112 being operative to yieldingly urge the leg assemblies 108 toward their retracted positions.

The flexible cover element 100 illustrated in FIGURES 1 and 3 of the drawings may be secured to the bows 76, 78 and 80 in any convenient manner and the lower edge portions of the opposite sides of the flexible cover element 100 include eyelets 114 with which pivoted anchors 116 carried by brackets 118 secured to the lower ends of the bows 76, 78 and 80 are engageable.

When it is desired to remove the flexible cover element 100 from the truck 10, it is merely necessary to disengage the end plates 50 from the bolts 46. Thereafter, the braces 94 may be disconnected from the brackets 98 and the track members 40 with the bows 76, 78 and 80 mounted thereon and having the flexible cover element 100 secured thereto may be removed from the mounting means or assembly 24. Further, it is believed quite obvious from the preceding description that the bows 76 and 80 may be shifted forwardly in order to position substantially all of the flexible cover element 100 at the forward end of the dump body portion 12. Thereafter, when it is desired to again cover the dump body portion 12, the bows 76 and 80 may again be positioned as illustrated in FIGURE 9 of the drawings and the inclined brace members 94 may be secured to the bow 80. Still further, the seat-forming members 104 are pivotable between the horizontally disposed operative positions and the vertically disposed inoperative positions independently of operation of the collapsible truck cover assembly 10. Still further, the seat-forming members 104 are fully operative even when the track-forming members 40 and the bows 76, 78 and 80 together with the flexible cover element 100 have been removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible seat structure for a truck load bed including sides and a bottom, mounting means adapted to be received between and supported adjacent said opposite sides, a pair of elongated opposite side seat-forming members each pivotally secured along one longitudinal edge thereof to the corresponding mounting means for swinging movement between a first generally horizontally disposed position and a second upstanding position closely adjacent the inner surfaces of the corresponding side of said load bed, said seat-forming members each including elongated leg means mounted thereon for movement between a retracted position closely underlying and generally parallelling the corresponding seat-forming member and an extended position depending downwardly from the corresponding seat-forming member when the latter is in its first position and adapted to engage said load bed bottom for support of the free edge portions of said seat-forming members therefrom, said mounting means comprising a pair of upstanding and horizontally elongated generally parallel frame assemblies adapted to be positioned within said load bed adjacent said side walls and having their lower marginal edge portions supported from said bottom, the lower ends of said leg means, when extended and when said seat forming members are in their horizontal positions, being generally horizontally aligned with the lower marginal portions of said frame assemblies for engagement with and support from said bottom.

2. The combination of claim 1 including means operatively connected between said leg means and said mounting means yieldingly urging said leg means toward their retracted positions.

3. A collapsible truck cover assembly comprising mounting means adapted to be supported in the load bed of a truck adjacent the opposite side walls thereof, a plurality of laterally spaced and downwardly opening cover element supporting bows supported from and extending between said mounting means adapted to have a flexible cover element disposed thereover for covering said load bed, the lower end portions of said bows including followers, a pair of generally horizontal and parallel elongated track members from which the followers of said bows are supported for movement therealong, said elongated track members and said mounting means including coacting portions releasably supporting said track members from said mounting means, said mounting means comprising a pair of upstanding and horizontally elongated generally parallel frame assemblies adapted to be positioned within said load bed closely adjacent said load bed sides and including lower marginal portions adapted to engage and be supported from said bottom, a pair of elongated opposite side seat forming members each pivotally secured along one longitudinal edge thereof to a corresponding frame assembly for swinging movement between a first generally horizontally disposed position and a second upstanding position adjacent the inner surface of the corresponding side of said load bed, said seat forming members each including elongated leg means mounted thereon for movement between or retracted position closely underlying and generally parallelling the corresponding seat forming member and an extended position depending downwardly from the corresponding seat forming member when the latter is in its first position, the lower ends of said leg means, when extended and when said seat means are in their horizontal positions, being generally horizontally aligned with the lower marginal portions of said frame assemblies for engagement with and support from said bottom.

4. The combination of claim 3 wherein each of said track members defines confronting upper and lower guide surfaces, each of said followers including a pair of follower elements spaced longitudinally along the corresponding track member.

5. The combination of claim 4 wherein said follower elements comprise rollers journaled for rotation about generally horizontal axes extending transversely of said track members.

6. The combination of claim 5 wherein the axes of rotation of the rollers of each follower are spaced above and below a generally horizontal plane disposed normal to the plane containing the corresponding bow.

7. The combination of claim 6, and opposite side brace means removably secured between opposite upper portions of the bow farthermost from one set of corresponding ends of said track members and said mounting means preventing movement of said upper portions toward said one set of corresponding ends.

References Cited

UNITED STATES PATENTS

| | | | |
|---|---|---|---|
| 905,571 | 12/1908 | Pangborn | 296—105 |
| 1,602,017 | 10/1926 | Hamilton | 296—105 |
| 1,713,923 | 5/1929 | Schlicher | 296—105 |
| 2,324,508 | 7/1943 | Johnson | 296—63 X |
| 2,817,344 | 12/1957 | Teeter | 296—100 X |
| 2,817,567 | 12/1957 | Shepherdson | 248—439 X |
| 2,836,476 | 5/1958 | Carter et al. | 248—439 |
| 3,201,171 | 8/1965 | Wickard | 296—100 |

OTHER REFERENCES

American Builder, Stanley Sliding Door Hardware, September 1951, page 83.

BENJAMIN HERSH, *Primary Examiner.*

J. SIEGEL, C. C. PARSONS, *Assistant Examiners.*